(12) United States Patent
Hur et al.

(10) Patent No.: US 12,211,193 B2
(45) Date of Patent: Jan. 28, 2025

(54) METHOD AND APPARATUS WITH IMAGE ANALYSIS

(71) Applicants: Samsung Electronics Co., Ltd., Suwon-si (KR); Korea Advanced Institute of Science and Technology, Daejeon (KR)

(72) Inventors: Youngbum Hur, Suwon-si (KR); Jinwoo Shin, Daejeon (KR); Jihoon Tack, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 470 days.

(21) Appl. No.: 17/574,959

(22) Filed: Jan. 13, 2022

(65) Prior Publication Data
US 2022/0392051 A1 Dec. 8, 2022

(30) Foreign Application Priority Data

Jun. 8, 2021 (KR) .......................... 10-2021-0074145
Jul. 21, 2021 (KR) .......................... 10-2021-0095455

(51) Int. Cl.
*G06T 7/00* (2017.01)
*G06T 3/60* (2024.01)
(Continued)

(52) U.S. Cl.
CPC .............. *G06T 7/0004* (2013.01); *G06T 3/60* (2013.01); *G06T 11/00* (2013.01); *G06V 10/40* (2022.01);
(Continued)

(58) Field of Classification Search
CPC ....... G06T 7/187; G06T 7/0012; G06V 10/26; G06V 40/193; G06F 3/011; G06F 3/012
See application file for complete search history.

(56) References Cited

U.S. PATENT DOCUMENTS 7,576,777 B2 * 8/2009 Kondo ................. G06V 10/443
348/208.4
8,964,298 B2 * 2/2015 Haddick .............. G02B 27/017
359/630
(Continued)

FOREIGN PATENT DOCUMENTS

WO WO 2020/247200 A1 12/2020

OTHER PUBLICATIONS

Lee, Kimin, et al. "A Simple Unified Framework for Detecting Out-of-Distribution Samples and Adversarial Attacks." *32nd Conference on Neural Information Processing Systems (NeurIPS) Montreal, Canada Advances in neural information processing systems* vol. 31 2018 (11 pages in English).
(Continued)

*Primary Examiner* — Yosef Kassa
(74) *Attorney, Agent, or Firm* — NSIP Law (57) ABSTRACT

A processor-implemented method with image analysis includes: receiving a test image; generating a plurality of augmented images by augmenting the test image; determining classification prediction values for the augmented images using a classifier; determining a detection score based on the classification prediction values; and determining whether the test image corresponds to anomaly data based on the detection score and a threshold.

23 Claims, 6 Drawing Sheets

(51) Int. Cl.
  *G06T 11/00* (2006.01)
  *G06V 10/40* (2022.01)
  *G06V 10/764* (2022.01)
  *G06V 10/77* (2022.01)
  *G06V 10/774* (2022.01)
  *G06V 10/82* (2022.01)

(52) U.S. Cl.
  CPC ........ *G06V 10/764* (2022.01); *G06V 10/7715* (2022.01); *G06V 10/7747* (2022.01); *G06V 10/82* (2022.01); *G06T 2207/20081* (2013.01); *G06T 2207/20084* (2013.01)

(56) References Cited

U.S. PATENT DOCUMENTS

| | | | | |
|---|---|---|---|---|
| 9,330,471 | B2* | 5/2016 | Venkatraman | G01C 21/12 |
| 9,367,962 | B2* | 6/2016 | Di Federico | G06T 7/73 |
| 9,761,054 | B2* | 9/2017 | Bronder | G06F 3/011 |
| 10,229,492 | B2* | 3/2019 | Kasmi | G06T 7/155 |
| 10,380,802 | B2* | 8/2019 | Grundhöfer | H04N 5/33 |
| 10,762,640 | B2* | 9/2020 | Mudretsov | H04N 23/611 |
| 2011/0074949 | A1 | 3/2011 | Hiraoka | |
| 2013/0278631 | A1* | 10/2013 | Border | G06F 3/04842 |
| | | | | 345/633 |
| 2014/0270499 | A1 | 9/2014 | Kono et al. | |
| 2020/0372339 | A1 | 11/2020 | Che et al. | |

OTHER PUBLICATIONS

Yu, Qing, et al. "Unsupervised Out-of-Distribution Detection by Maximum Classifier Discrepancy." *Proceedings of the IEEE/CVF International Conference on Computer Vision* 2019 pp. 9518-9526.

Sohn, Kihyuk, et al. "FixMatch: Simplifying Semi-Supervised Learning with Consistency and Confidence." arXiv:2001.07685 2020 (21 pages in English).

Sastry, Chandramouli Shama, et al. "Detecting out-of-distribution examples with gram matrices." *Proceedings of 37th International Conference on Machine Learning PMLR* vol. 119, 2020 (11 pages in English).

Geng, Chuanxing, et al. "A Multi-view Perspective of Self-supervised Learning." arXiv:2003.00877v2 May 15, 2020 (7 pages in English).

Lin, Cheng-Hung, et al. "An Efficient Data Augmentation Network for Out-of-Distribution Image Detection." *IEEE Access vol. 9 Department of Electrical Engineering, National Taiwan Normal University*, Taipei 106, Taiwan Mar. 5, 2021 pp. 35313-35323.

Arar, Moab, et al. "InAugment: Improving Classifiers via Internal Augmentation." arXiv:2104.03843v1 Apr. 8, 2021 (10 pages in English).

Bhat, Prashant, et al. "Distill on the Go: Online knowledge distillation in self-supervised learning." *Proceedings of the IEEE/CVF Conference on Computer Vision and Pattern Recognition* arXiv:2104.09866v1 Apr. 20, 2021 (10 pages in English).

Hendrycks, Dan, et al. "The Many Faces of Robustness: A Critical Analysis of Out- of-Distribution Generalization." *Proceedings of the IEEE/CVF International Conference on Computer Vision* arXiv:2006.16241v3 Jul. 24, 2021 (18 pages in English).

* cited by examiner

METHOD AND APPARATUS WITH IMAGE ANALYSIS

CROSS-REFERENCE TO RELATED APPLICATIONS

This application claims the benefit under 35 USC § 119(a) of Korean Patent Application No. 10-2021-0074145 filed on Jun. 8, 2021 and Korean Patent Application No. 10-2021-0095455 filed on Jul. 21, 2021, in the Korean Intellectual Property Office, the entire disclosures of which are incorporated herein by reference for all purposes.

BACKGROUND

1. Field

The following description relates to a method and apparatus with image analysis.

2. Description of Related Art

Technologies may detect defects in products produced in an automated product manufacturing process and defects that may occur in a particular process or a particular device during a product manufacturing process.

Technologies for detecting defects that may occur in a product manufacturing process may include anomaly detection which is a data classification technology to detect a product with a different pattern from that of a normal product and anomaly data related to the product. In addition, anomaly detection may be used in not only data management field for a product manufacturing process but also in system operation and security-related systems.

Unlike a deep-learning-based algorithm requiring both normal and anomaly data, anomaly detection is may be used in a high yield manufacturing process which has a difficulty in securing sufficient anomaly data due to a low defect rate, since anomaly detection may detect anomaly data based on normal data.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with image analysis includes: receiving a test image; generating a plurality of augmented images by augmenting the test image; determining classification prediction values for the augmented images using a classifier; determining a detection score based on the classification prediction values; and determining whether the test image corresponds to anomaly data based on the detection score and a threshold.

The generating of the augmented images may include: generating transformed images by transforming the test image; and generating a rotated image by rotating the test image.

The determining of the classification prediction values may include determining classification prediction values for the transformed images using the classifier, and the classifier may include an image classifier.

The method may include determining a rotation prediction value for the rotated image using a rotation classifier; and determining a rotation loss value based on the rotation prediction value and a rotation value applied for the rotating of the test image.

The determining of the detection score may include: determining a classification entropy value based on the classification prediction values; and determining the detection score based on the classification entropy value and the rotation loss value.

The determining of the detection score based on the classification entropy value and the rotation loss value may include determining a result value determined by adding the classification entropy value and the rotation loss value, the result value being the detection score.

The determining of the classification entropy value may include determining the classification entropy value by applying an average value of the classification prediction values to an entropy function.

The determining of whether the test image corresponds to the anomaly data may include: in response to the detection score being greater than or equal to the threshold, determining that the test image corresponds to the anomaly data; and in response to the detection score being less than the threshold, determining that the test image corresponds to normal data.

The anomaly data may be data outside a range of training data used during a training process of the classifier, and the normal data may be data within the range of training data used during the training process of the classifier.

The determining of the classification prediction values may include extracting features from the augmented images using a convolutional neural network, and the image classifier may be configured to receive the extracted features as inputs and provide the classification prediction values for the augmented images respectively based on the input features.

The test image may be a training image, and the method may include: determining a loss value based on the classification prediction values; and training the classifier based on the loss values.

In another general aspect, one or more embodiments include a non-transitory computer-readable storage medium storing instructions that, when executed by a processor, configure the processor to perform any one, any combination, or all operations and methods described herein.

In another general aspect, an apparatus with image analysis includes: one or more processors configured to: receive a test image, generate a plurality of augmented images by augmenting the test image, determine classification prediction values for the augmented images using a classifier, determine a detection score based on the classification prediction values, and determine whether the test image corresponds to anomaly data based on the detection score and a threshold.

For the generating of the augmented images, the one or more processors may be configured to: generate transformed images by transforming the test image, and generate a rotated image by rotating the test image.

The one or more processors may be configured to: determine a rotation prediction value for the rotated image using a rotation classifier, and determine a rotation loss value based on the rotation prediction value and a rotation value applied for the rotating of the test image.

For the determining of the detection score, the one or more processors may be configured to: determine a classification entropy value based on the classification prediction values, and determine the detection score based on the classification entropy value and the rotation loss value.

For the determining of the classification entropy value, the one or more processors may be configured to determine the classification entropy value based on an average value of the classification prediction values.

For the determining of whether the test image corresponds to the anomaly data, the one or more processors may be configured to: in response to the detection score being greater than or equal to the threshold, determine that the test image corresponds to the anomaly data; and in response to the detection score being less than the threshold, determine that the test image corresponds to normal data.

The apparatus may include a memory storing instructions that, when executed by the one or more processors, configure the one or more processors to perform the receiving of the test image, the generating of the augmented images, the determining of the classification prediction values, the determining of the detection score, and the determining of whether the test image corresponds to the anomaly data.

In another general aspect, a processor-implemented method with image analysis includes: generating a plurality of augmented images by augmenting a test image; determining prediction values for the augmented images using one or more classifiers; determining a detection score based on the prediction values; and determining, based on the detection score and a threshold, whether the test image corresponds to data outside a distribution of training data used to train the classifier.

The determining of whether the test image corresponds to data outside the distribution may include determining that a class of the test image is not included in the training data.

The test image may be of an object, and the method may include detecting a defect in the object in response to the detection score being greater than or equal to the threshold.

In another general aspect, a processor-implemented method with image analysis includes: receiving a training image; generating a plurality of augmented images by augmenting the training image; determining classification prediction values for the augmented images using a classifier; determining a loss value based on the classification prediction values; and training the classifier based on the loss values.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only and is not to be limiting of the present disclosure. As used herein, the singular forms "a", "an", and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, integers, steps, operations, elements, components, numbers, and/or combinations thereof, but do not preclude the presence or addition of one or more other features, integers, steps, operations, elements, components, numbers, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains after and understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, example embodiments will be described in detail with reference to the accompanying drawings. When describing the example embodiments with reference to the accompanying drawings, like reference numerals refer to like components and a repeated description related thereto will be omitted.

Figure 1:
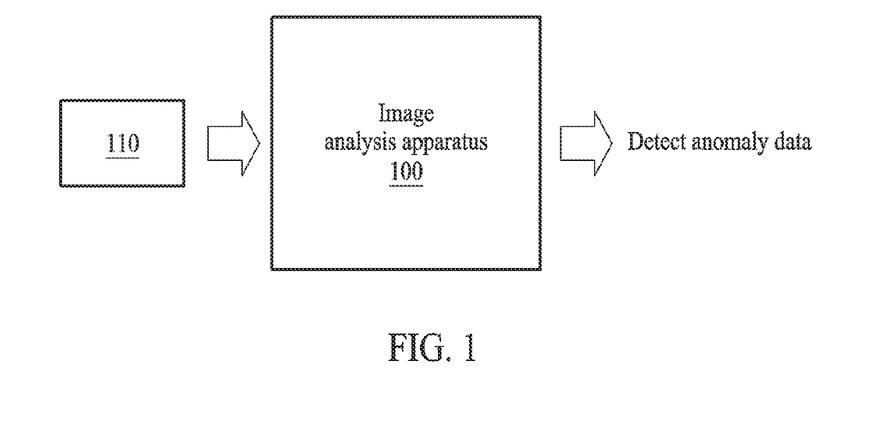
FIG. 1 illustrates an example of an overview of an image analysis for anomaly detection.

FIG. 1 illustrates an example of an image analysis for anomaly detection.

Referring to FIG. 1, an image analysis apparatus 100 is an apparatus for performing anomaly detection based on an image. The image analysis apparatus 100 may receive a test image 110 and analyze the test image 110 using a classifier. The image analysis apparatus 110 may detect whether the test image 110 corresponds to anomaly data (in other words, abnormal data) based on an analysis result. The test image 110 may be an image targeted for anomaly detection and may be replaced with terms, an "input image" or an "image".

In the present disclosure, "anomaly detection" may include a detection for whether the test image 110 is out-of-distribution (OOD) data. Detecting whether the test image 110 is OOD data or not (simply, an OOD detection), may indicate identifying whether the given test image 110 is from an outside of a training distribution of the classifier used for an image analysis. When a class of the test image 110 has a class which is not included in training data used for training the classifier, the image analysis apparatus 100 may classify the test image 110 as OOD data. That the test image 110 being OOD data may indicate that the test image 110 (or an object shown in the test image 110) may be a sample that is not learned during a training process of the classifier. As a result of analyzing the test image 110, when the test image 110 is determined to be from an inside of the training distribution of the classifier, the image analysis apparatus 100 may classify the test image 110 as normal data. When a distribution of the training data is defined as in distribution (ID), data not following the distribution may be classified as the OOD data, and data following the distribution may be classified as the normal data (or, ID data).

The OOD detection as above, may be important or essential for a classifier to be used in real world applications. In a case of inputting OOD data to the classifier trained in accordance with a distribution of training data, the classifier may have insufficient or no capability to detect the OOD data and may provide an erroneous classification result for the OOD data. Thus, to increase a classification accuracy, the image analysis apparatus 100 of one or more embodiments may detect whether the test image 110 corresponds to the OOD data. The OOD detection of one or more embodiments may precisely predict with respect to the ID data and filter the OOD data.

The image analysis apparatus 100 performing an anomaly detection may be applied to various image-based inference fields. For example, the image analysis apparatus 100 may be used in fields such as product defect inspection, anomaly detection for equipment, object recognition, anomaly detection for medical images, and video surveillance.

As a typical technology, anomaly detection may be performed based on a feature extracted from internal layers of the classifier. However, for a dataset difficult to classify, a feature may not be well classified in the internal layers. Due to the phenomenon, the typical technology using the feature extracted from internal layers may have a low performance in anomaly detection for the dataset difficult to classify.

The image analysis apparatus 100 may generate a plurality of augmented images by performing an image augmentation for the test image 110 and perform an anomaly detection based on the generated augmented images. The augmented images may include a transformed image and/or a rotated image, and the image analysis apparatus 100 may identify anomaly data based on an entropy value of the transformed image and/or a rotation loss value of the rotated image. The image analysis apparatus 100 of one or more embodiments may have an advantageous effect of providing a high accuracy in anomaly detection for a dataset difficult to classify as well as a dataset easy to classify. The image analysis apparatus 100 of one or more embodiments may provide a robust performance in anomaly detection against a change in classification difficulty level of the test image 110. Hereinafter, a non-limiting example of a process of performing an image analysis to detect anomaly data will be described in more detail.

Figure 2:
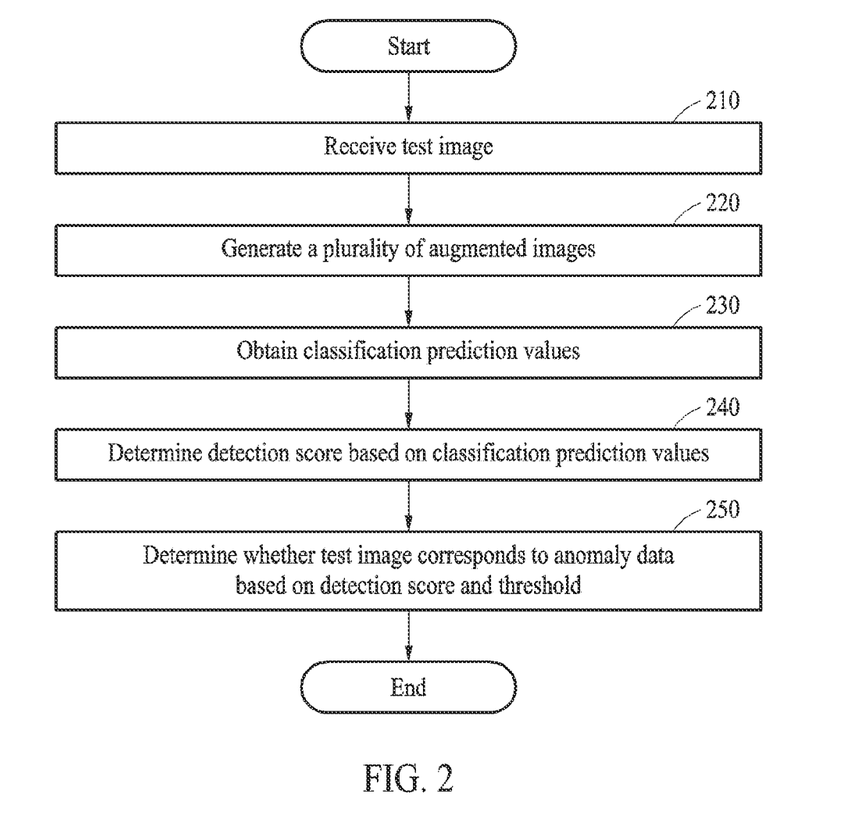
FIG. 2 illustrates an example of an image analysis method.

FIG. 2 illustrates an example of an operation of an image analysis method. Operations of the image analysis method may be performed by the image analysis apparatus 100 of FIG. 1, an image analysis apparatus 600 of FIG. 6, and/or a computing device 700 of FIG. 7.

Referring to FIG. 2, in operation 210, an image analysis apparatus may receive a test image. In operation 220, the image analysis apparatus may generate a plurality of augmented images by an augmentation of the test image. A process of augmenting the test image may include a process of generating transformed images by transforming the test image through the image augmentation. The image analysis apparatus may generate the augmented images by applying a plurality of the image augmentations to the test image. The image augmentation may be a technique for increasing a diversity of an image by, for example, a geometric transformation (such as enlarging, distorting, inverting, cutting, and/or cropping, as non-limiting examples) or a photometric transformation (such as changing a contrast, changing a saturation, changing a brightness, white balancing, adjusting color, and/or changing a color space, as non-limiting examples). A type of the image augmentation to be performed for generating augmented images may be randomly determined.

In operation 230, the image analysis apparatus may obtain (e.g., determine) classification prediction values for the augmented images using a classifier. For example, the image analysis apparatus may obtain the classification prediction values for the transformed images respectively using an image classifier (for example, an image classifier 430 of FIG. 4) that is based on a neural network. The image classifier may provide, for an input augmented image, a class indicated by an object in the augmented image and information on a probability of corresponding to the class. The image classifier may include a softmax layer to estimate the class and the probability information.

In operation 240, the image analysis apparatus may determine a detection score based on the classification prediction values obtained in operation 230. The image analysis apparatus may determine a classification entropy value based on the determined classification prediction values for the augmented images and determine the detection score based on the classification entropy value. The image analysis apparatus may determine, for example, a result value obtained by applying an average value of all of the classification prediction values, an average value of some of the classification prediction values, or an average value of weighted sums of the classification prediction values to an entropy function as the classification entropy value. The determined classification entropy value may be determined as the detection score.

In operation 250, the image analysis apparatus may determine whether the test image corresponds to anomaly data based on the detection score and a threshold. The image analysis apparatus may compare the detection score and the threshold and determine that the test image corresponds to the anomaly data in response to the detection score being greater than or equal to the threshold. Conversely, in response to the detection score being less than the threshold, the image analysis apparatus may determine that the test image corresponds to normal data. The anomaly data may be data outside a range of training data used during a training process of the classifier (for example, an image classifier), and the normal data may be data within the range of the training data used during the training process of the classifier.

As described above, the image analysis apparatus of one or more embodiments may generate the augmented images of the test image without using a feature value of an internal layer of the classifier and may determine the detection score based on the augmented images generated in accordance with the process described above, and then detect the anomaly data based on the detection score. Through this, the image analysis apparatus of one or more embodiments may provide a high-accuracy performance in anomaly detection for a test image easy to classify as well as a test image difficult to classify.

Figure 3:
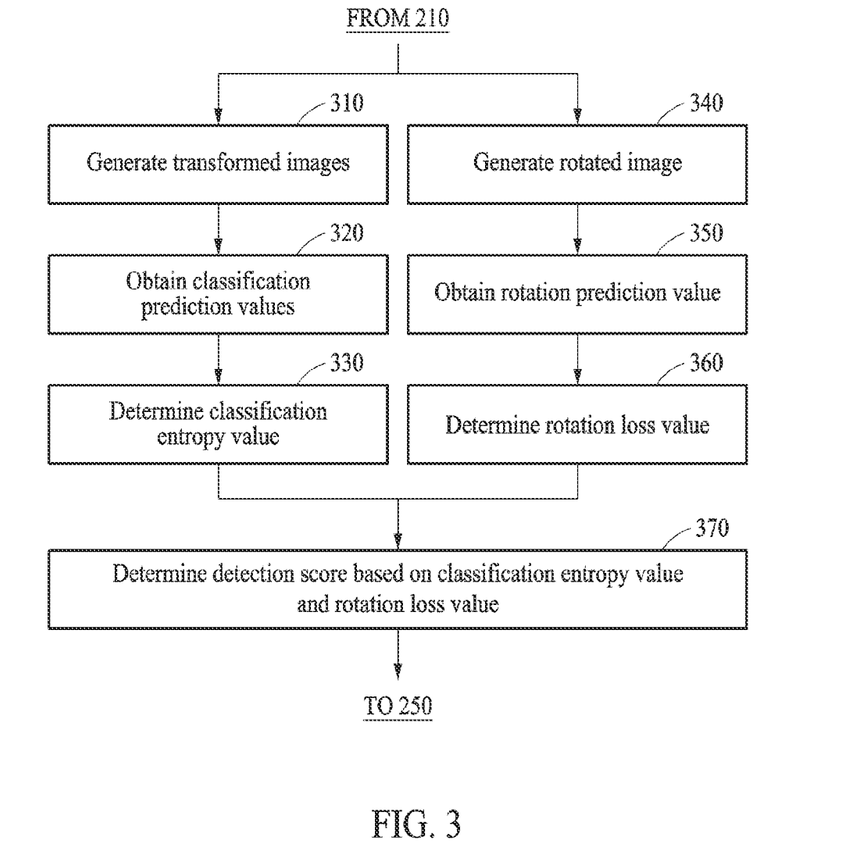
FIG. 3 illustrates an example of an image analysis method further considering a rotation loss for anomaly detection.

FIG. 3 illustrates an example of an operation of an image analysis method further considering a rotation loss of a rotated image as well as classification prediction values for transformed images. Operations of the image analysis method may be performed by the image analysis apparatus 100 of FIG. 1, the image analysis apparatus 600 of FIG. 6, and/or the computing device 700 of FIG. 7.

Referring to FIG. 3, in operation 310, the image analysis apparatus may generate transformed images by transforming the test image, after operation 210 of FIG. 2. The image analysis apparatus may generate the transformed images by applying a randomly determined image augmentation method to the test image. Operation 310 may correspond to operation 220 of FIG. 2.

In operation 320, the image analysis apparatus may obtain classification prediction values for the transformed images using the image classifier. A transformed image may be input to the image classifier, and the classification prediction value for the corresponding transformed image may be output from the image classifier. The classification prediction values for the transformed images may be determined respectively by the image classifier. In an example, by using a convolutional neural network (CNN), features may be extracted from the augmented images respectively, and the extracted features may be input to the image classifier. The image classifier may provide the classification prediction values for the augmented images respectively based on the input features. A neural network used for extracting the features from the augmented images may include a CNN, a deep neural network (DNN), a recurrent neural network (RNN), a bidirectional RNN, a deep belief network (DBN), and an auto encoder, but not limited thereto. Operation 320 may correspond to operation 230 of FIG. 2.

In operation 330, the image classifier may determine a classification entropy value based on the classification prediction values. For example, the image classifier may determine the classification entropy value by applying an average value of all of the classification prediction values, an average value of some of the classification prediction values, or an average value of weighted sums of the classification prediction values to an entropy function.

In operation 340, the image analysis apparatus may generate a rotated image by rotating the test image. For example, the image analysis apparatus may generate the rotated image by rotating the test image by any one of 90 degrees, 180 degrees, and 270 degrees. A range of the angle by which the test image is rotated may not be limited to above, and the test image may be rotated by any number of degrees. For example, the image analysis apparatus may generate the rotated image by rotating the test image by a 45-degree unit (such as any of 45 degrees, 90 degrees, 135 degrees, or 180 degrees).

In operation 350, the image analysis apparatus may obtain a rotation prediction value for the rotated image using a rotation classifier. The rotation classifier may be a classifier predicting how many degrees the rotated image has been rotated from the test image, and may be based on or include a trained neural network. The rotated image may be input to the rotation classifier, and the rotation classifier may provide the rotation prediction value corresponding to the rotated image as an output.

In operation 360, the image analysis apparatus may determine a rotation loss value based on the rotation prediction value and a rotation value applied when the test image is rotated. The image analysis apparatus may calculate a cross entropy based on the rotation prediction value output from the rotation classifier and the actually applied rotation value, and determine the calculated cross entropy value as the rotation loss value.

In operation 370, the image analysis apparatus may determine a detection score based on the classification entropy value determined in operation 330 and the rotation loss value determined in operation 360. The image analysis apparatus may determine, for example, a result value obtained by adding the classification entropy value and the rotation loss value, or a weighted sum or an average value of the classification entropy value and the rotation loss value as the detection score. Thereafter, the image analysis apparatus may determine whether the test image corresponds to anomaly data based on the detection score and a threshold as shown in operation 250 of FIG. 2.

Through the above process, the image analysis apparatus of one or more embodiments may provide a high-accuracy performance in anomaly detection for a test image easy to classify as well as a test image difficult to classify.

Figure 4:
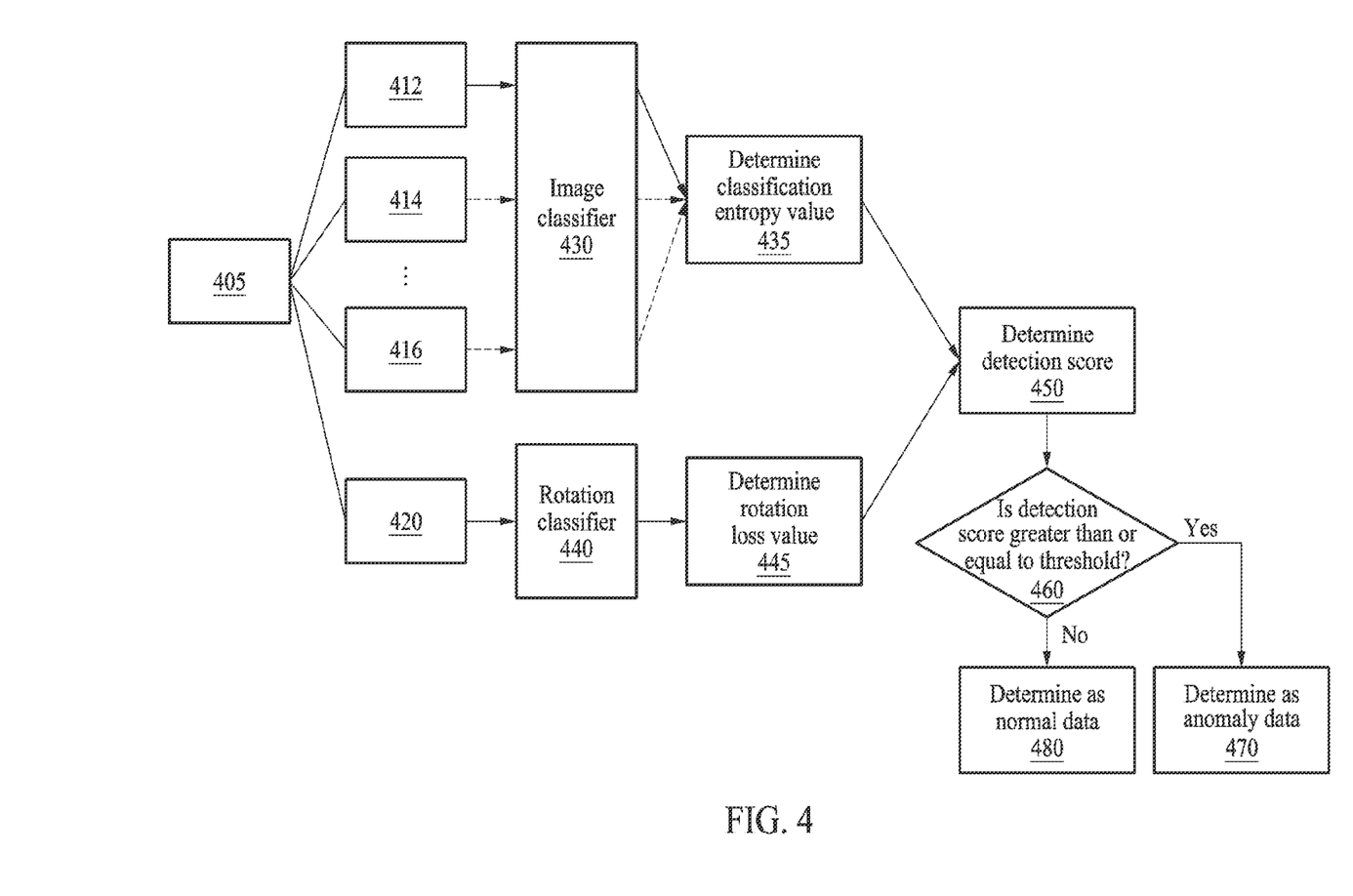
FIG. 4 illustrates an example of a process of detecting anomaly data by an image analysis.

FIG. 4 illustrates an example of a process of detecting anomaly data by an image analysis.

Referring to FIG. 4, a test image 405 which is a target of detection of anomaly data may be given. An image analysis apparatus may generate a plurality of augmented images 412, 414, and 416 by applying a plurality of image augmentations to the test image 405. A technique of the image augmentation to be applied to the test image 405 may be randomly determined, and transformation types shown in the augmented images 412, 414, and 416 may be varied thereby.

The image analysis apparatus may obtain classification prediction values for the augmented images 412, 414, and 416 through the image classifier 430, and may determine a classification entropy value in operation 435 based on the classification prediction values for the augmented images 412, 414, and 416. The augmented images 412, 414, and 416 may be sequentially input to the image classifier 430, and the classification prediction values for the augmented images 412, 414, and 416 may be output from the image classifier

430. The image analysis apparatus may determine the classification entropy value by obtaining an average value of probability values (classification prediction values) for the augmented images 412, 414, and 416 output from a softmax layer of the image classifier 430 and calculating an entropy value of the average value. The classification entropy value may be calculated by, for example, Equation 1 below.

$$S_{aug\text{-}ent}(x) := \mathcal{H}(\mathbb{E}_{T \sim \mathcal{T}}[p_\theta(T(x))]) \quad \text{Equation 1:}$$

In Equation 1, $S_{aug\text{-}ent}(x)$ may denote a classification entropy value, and $\mathcal{H}$ may denote an entropy function may denote a test input, (e.g., the test image 405), and θ may denote an image classifier (e.g., the image classifier 430). $p_\theta(T(x))$ may denote a classification prediction value output from the image classifier θ for an augmented image $T(x)$. $\mathcal{T}$ may represent an augmentation family of augmented images (e.g., the augmented images 412, 414, and 416). $\mathbb{E}_{T \sim \mathcal{T}}[p_\theta(T(x))]$ may denote an average value of the classification prediction values for the augmented images.

Meanwhile, the image analysis apparatus may generate a rotated image 420 by rotating the test image 405 by a rotation angle randomly selected from predefined rotation angles. The image analysis apparatus may obtain a rotation prediction value through a rotation classifier 440 and in operation 445, may determine a rotation loss value based on the rotation prediction value for the rotated image 420 and an actual rotation value applied to the rotated image 420. The rotation classifier 440 may provide the rotation prediction value indicating how much the rotated image 420 input to the rotation classifier 440 has been rotated. The image analysis apparatus may calculate a cross entropy value based on the rotation prediction value and the actual rotation value and may determine the rotation loss value based on the cross entropy value. The rotation loss may be a supervised loss and may be a cross entropy loss occurring during a process of predicting a label with a rotation angle of the rotated image 420 as the label (for example, a 0-degree rotation, a 90-degree rotation, a 180-degree rotation, or a 270-degree rotation). The rotation loss value may be calculated, for example, as per Equation 2 below.

$$\mathcal{L}_{self}(x) := \frac{1}{S} \sum_{T_d \in \mathcal{T}_{dist}} \mathcal{L}_{CE}(p_d(T_d(x)), T_d) \quad \text{Equation 2}$$

In Equation 2, $\mathcal{L}_{self}(x)$ may represent a rotation loss value, and $\mathcal{L}_{CE}$ may represent a standard cross-entropy. $T_d$ may denote an actual rotation value, and $\mathcal{T}_{dist}$ may represent a distribution of actual rotation value possibly denoted as $\mathcal{T}_{dist} := \{T_d^0 = I, T_d^1, \ldots, T_d^{S-1}\}$ may correspond to a number of the actual rotation values to be applied to the test input, (e.g., the test image 405). $T_d(x)$ may denote a rotated image (e.g., the rotated image 420), and $p_d(T_d(x))$ may denote a rotation prediction value for the rotated image output from a rotation classifier (e.g., the rotation classifier 440).

In operation 450, the image analysis apparatus may determine a detection score based on the classification entropy value and the rotation loss value. For example, as shown in Equation 3 below, the image analysis apparatus may determine a result value obtained by adding the classification entropy value $s_{aug\text{-}ent}(x)$ determined in Equation 1 to the rotation loss value $\mathcal{L}_{self}(x)$ determined in Equation 2 as the detection score $s_{extend}(x)$.

$$S_{extend}(x) := S_{aug\text{-}ent}(x) + \mathcal{L}_{self}(x) \quad \text{Equation 3:}$$

In operation 460, the image analysis apparatus may determine whether the determined detection score is greater than or equal to a threshold. In operation 470, the image analysis apparatus may determine that the test image 405 corresponds to anomaly data (or, OOD data) in response to the detection score being greater than or equal to the threshold. In operation 480, the image analysis apparatus may determine that the test image 405 corresponds to normal data (ID data) in response to the detection score being less than the threshold.

Figure 5:
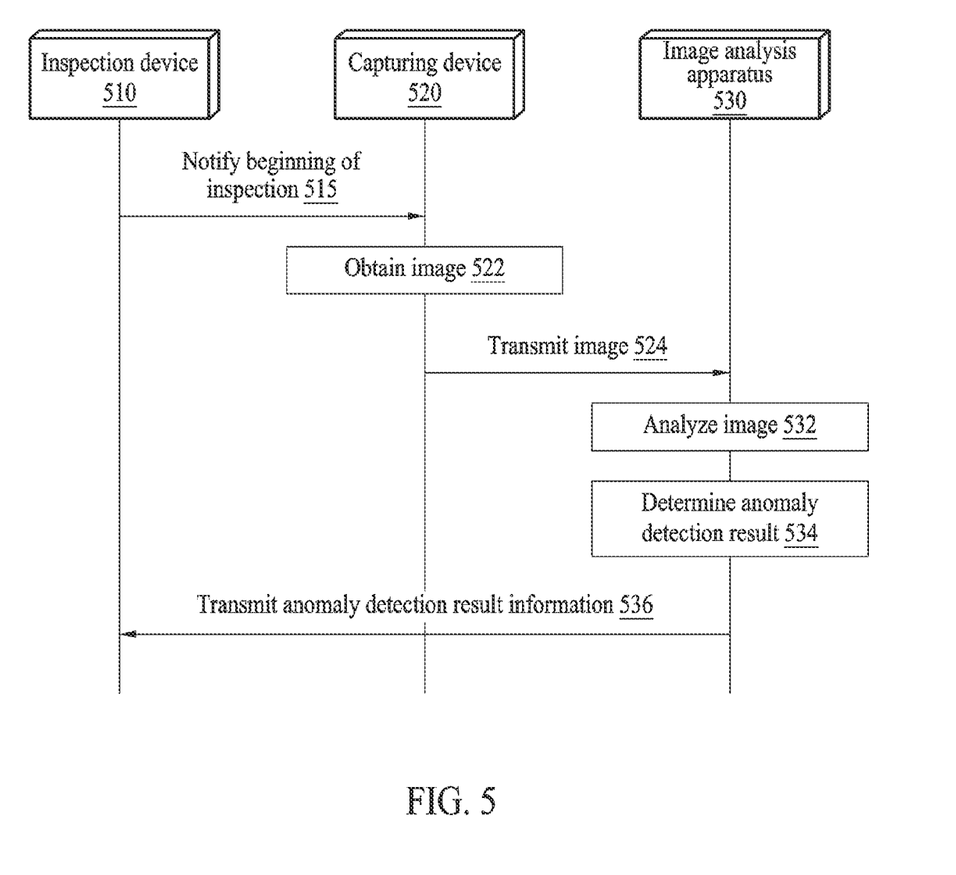
FIG. 5 illustrates an example of performing an image analysis for anomaly detection by linking an image analysis apparatus to an inspection device.

FIG. 5 illustrates an example of performing an image analysis for anomaly detection by linking an image analysis apparatus to an inspection device.

Referring to FIG. 5, an image analysis apparatus 530 (for example, the image analysis apparatus 100 of FIG. 1 or the image analysis apparatus 600 of FIG. 6) may be used for anomaly detection for a product using an image. An inspection device 510 may be a device for inspecting a product, for example, a device for inspecting whether a semiconductor wafer is defective. In operation 515, the inspection device 510 may notify a beginning of an inspection to a capturing device 520 such as a camera for the inspection of a product. The inspection device 510 may transmit a control signal to activate image capturing to the capturing device 520 to control the capturing device 520 to capture an image of the product.

In response to receiving a notification of the beginning of the inspection from the inspection device 510, the capturing device 520 may obtain an image of the product in operation 522. In operation 524, the capturing device 520 may transmit the obtained image to the image analysis apparatus 530. According to an example, the capturing device 520 may be included in the inspection device 510 and operated. The capturing device 520 may be an unmanned surveillance camera in a smart factory to capture an image for detecting whether a product is defective.

The image analysis apparatus 530 may be connected wirelessly or with a cable to the capturing device 520 (or the inspection device 510 which includes the capturing device 520). In operation 532, the image analysis apparatus 530 may analyze the image received from the capturing device 520. In operation 534, the image analysis apparatus 530 may determine a result of anomaly detection based on the image analysis result. The image analysis apparatus 530 may analyze the image according to the image analysis process described above with reference to FIG. 2 or 3 and determine whether the image corresponds to anomaly data. In operation 536, the image analysis apparatus 530 may transmit information on the result of the anomaly detection to the inspection device 510. If it is determined that an anomaly is detected from the image of the product based on the information on the result of the anomaly detection, the inspection device 510 may perform operations such as separately classifying the product or recording anomaly information.

Figure 6:
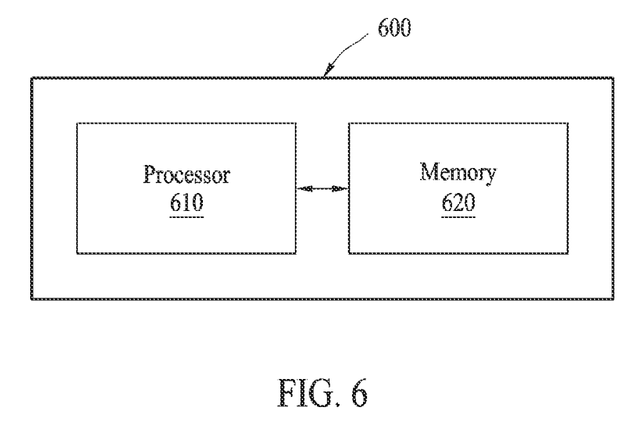
FIG. 6 illustrates an example of a configuration of an image analysis apparatus.

FIG. 6 illustrates an example of a configuration of an image analysis apparatus.

Referring to FIG. 6, the image analysis apparatus 600 may be a computing device to detect whether a test image corresponds to anomaly data and may correspond to the image analysis apparatus 100 of FIG. 1. The image analysis apparatus 600 may include a processor 610 (e.g., one or more processors) and a memory 620 (e.g., one or more memories) and may further include a capturing device to obtain a test image in accordance with an example.

The processor 610 may control an overall operation of the image analysis apparatus 600. The processor 610 may be implemented using one or more of processors, and the one or more of processors may include a general-purpose processor such as a central processing unit (CPU), an application processor (AP), and a digital signal processor (DSP), a graphics-dedicated processor such as a graphics processing unit (GPU) and a vision processing unit (VPU), or a neural processing unit (NPU).

The memory 620 may store information necessary for the processor 610 to perform a processing operation. For example, the memory 620 may store one or more instructions to be executed by the processor 610, a classifier (for example, an image classifier, a rotation classifier), and related information while a software or a program is executed in the image analysis apparatus 600. The memory 620 may include a volatile memory such as a random access memory (RAM), a dynamic RAM (DRAM), and a static RAM (SRAM) and/or a non-volatile memory known in the art such as a flash memory.

The processor 610 may control the image analysis apparatus 600 to perform one or more or all of the operations described above through FIGS. 1 to 5 by executing the one or more of instructions stored in the memory 620.

In an example, the processor 610 may receive a test image and generate a plurality of augmented images by augmenting the test image. The processor 610 may generate transformed images by transforming the test image and generate a rotated image by rotating the test image. The processor 610 may obtain classification prediction values for the augmented images using an image classifier and determine a classification entropy value based on the classification prediction values. The processor 610 may determine the classification entropy value by applying an average value of the classification prediction values, an average value of some of the classification prediction values, or an average value of weighted sums of the classification prediction values to an entropy function. The processor 610 may obtain a rotation prediction value for the rotated image using a rotation classifier and may determine a rotation loss value based on the rotation prediction value and a rotation value applied when the test image is rotated. The processor 610 may determine a detection score based on the classification entropy value and the rotation loss value. The processor 610, for example, may determine a result value obtained by adding the classification entropy value and the rotation loss value, or a weighted sum or an average value of the classification entropy value and the rotation loss value as the detection score. The processor 610 may determine whether the test image corresponds to anomaly data based on the detection score and a threshold. The processor 610 may determine that the test image corresponds to the anomaly data in response to the detection score being greater than or equal to the threshold and determine that the test image corresponds to normal data in response to the detection score being less than the threshold.

Figure 7:
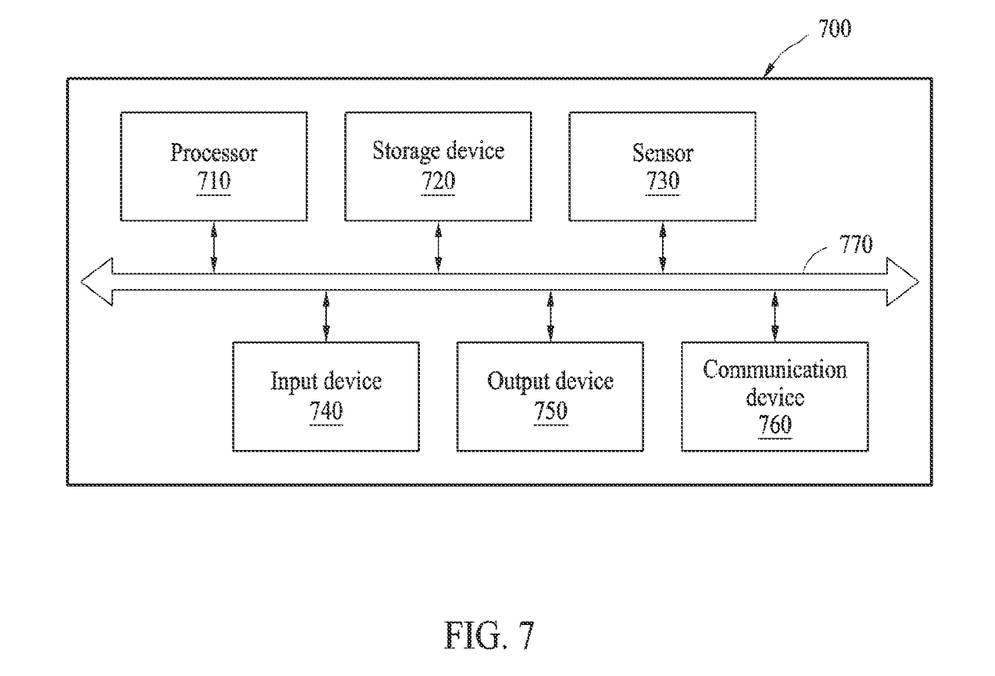
FIG. 7 illustrates an example of a configuration of a computing device.

FIG. 7 illustrates an example of a configuration of a computing device.

Referring to FIG. 7, a computing device 700 may be a computing device in various forms. For example, the computing device 700 may be a smartphone, a tablet computer, a wearable device, a netbook, a laptop, a product inspection device, a personal computer, and a server, but not limited thereto.

The computing device 700 may include a processor 710 (e.g., one or more processors), a storage device 720 (e.g. one or more memorie), a sensor 730, an input device 740, an output device 750 and a communication device 760. The components of the computing device 700 may communicate with each other via a communication bus 770. The computing device 700 may perform any or all operations of the image analysis apparatus described above (e.g., the image analysis apparatus 100 of FIG. 1 or the image analysis apparatus 600 of FIG. 6).

The processor 710 may control an overall operation of the computing device 700 and may execute functions and instructions to be executed within the computing device 700. The processor 710 may perform the operations described above through FIGS. 1 to 6.

The storage device 720 may store information necessary for the computing device 700 to perform an operation. For example, the storage device 720 may store instructions or a program to process and control the processor 710 and may store input/output data (for example, a classifier and a test image). The storage device 720 may include a RAM, a DRAM, a SRAM, a flash memory, a hard disk, a magnetic disk, an optical disk, or other types of non-volatile memories known in the art.

The sensor 730 may include an image capturing device such as an image sensor and a video sensor. The image capturing device may obtain a test image to examine anomaly data.

The input device 740 may receive a user input from a user through a tactile, video, audio, or touch input. For example, the input device 740 may include a keyboard, a mouse, a touchpad, a microphone, or any other device that transmits the user input to the computing device 700.

The output device 750 provides an output of the computing device 700 to a user through a visual, auditory, or tactile channel. The output device 760 may include, for example, a display panel for a liquid crystal display or a light-emitting diode (LED)/organic LED (OLED) display, a touch screen, a speaker, a vibration generator, or any other device that provides the output to the user. For example, the output device 750 may provide information on a result of anomaly detection for the test image.

The communication device 760 may communicate with an external device through a wired network or a wireless network (for example, a cellular communication, a Bluetooth communication, a short-range wireless communication, a wireless fidelity (Wi-Fi) communication, and an infrared communication). The test image may be transmitted to the computing device 700 through the communication device 760, or the information on the result of the anomaly detection for the test image may be transmitted to an outside of the computing device 700.

Figure 8:
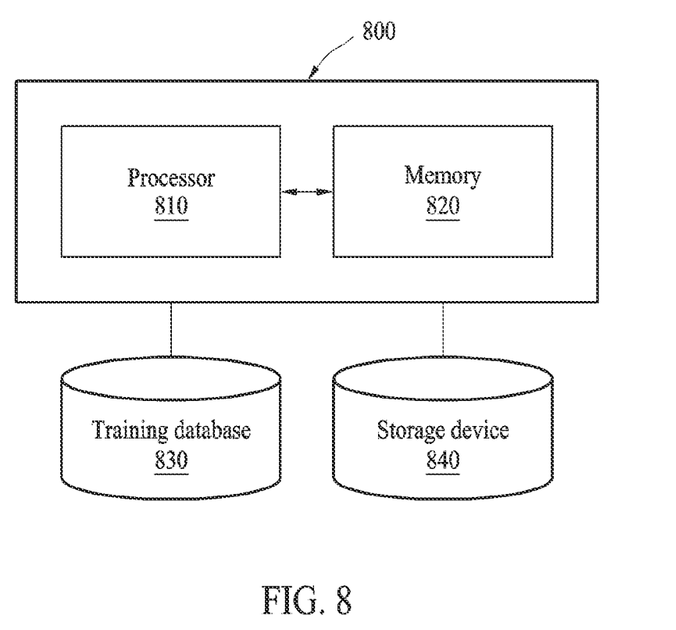
FIG. 8 illustrates an example of a training device.

FIG. 8 illustrates an example of a training device.

Referring to FIG. 8, a training device 800 may include a processor 810 (e.g., one or more processors) and a memory 820 (e.g., one or more memories) configured to store instructions executable by a processor 810, wherein the processor 810 may perform a process of training a classifier by executing the instructions stored in the memory 820.

The processor 810 may train the classifier (for example, the image classifier 430 and the rotation classifier 440 of FIG. 4) stored in a storage device 840. Herein, the term "training" may refer to machine learning of a computer. The training of the classifier may be an adjustment of a parameter (for example, a connection weight) of a neural network to perform a desired feature (or, purpose) by training the neural network using a plurality of training data by a training algorithm, wherein the neural network operates as the classifier. The parameter of the neural network may be optimized by training.

A training image stored in a training database 830 may be used as training data. For the training of the classifier, the processor 810 may perform a process similar to the anomaly data detection process shown in FIG. 4. The processor 810 may generate augmented images by augmenting the training image and may obtain classification prediction values for the augmented images through the image classifier. The processor 810 may generate a weakly augmented image and a strongly augmented image by an image augmentation. The degree of the augmentation may indicate how much the augmented image is transformed from the original training image. The processor 810 may adjust a parameter of the image classifier to reduce a difference between the classification prediction value for the weakly augmented image and the classification prediction value for the strongly augmented image. For this, a Kullback-Leibler divergence (KLD) function may be used as in Equation 4 below.

$$\mathcal{L}_{con}(x):=KL(p_\theta(T_w(x))\|p_\theta(T_s(x))) \quad \text{Equation 4:}$$

$\mathcal{L}_{con}(x)$ may denote a loss value determined based on augmented images. KL( ) may denote a KLD function. $p_\theta(T_w(x))$ may represent a classification prediction value for a weakly augmented image and a classification prediction value for a strongly augmented image, respectively. The processor 810 may train the image classifier to reduce the loss value $\mathcal{L}_{con}(x)$. The processor 810 may train the image classifier to render the image classifier to output consistent classification prediction values for the augmented images in various forms.

In addition, the processor 810 may generate a rotated image by rotating the training image and may train a rotation classifier based on the rotated image. The processor 810 may adjust parameters of the rotation classifier to reduce a difference between a rotation prediction value output from the rotation classifier for the rotated image and an actual rotation value applied when the rotated image is generated. The processor 810 may train the rotation classifier to predict better the actual rotation value applied to the rotated image. For example, the processor 810 may calculate a rotation loss value based on the actual rotation value and the rotation prediction value output from the rotation classifier as per Equation 2 above and may renew the parameters of the rotation classifier such that the rotation loss value decreases. In addition, according to an example, the processor 810 may obtain three rotated images by rotating the training image by 90 degrees, 180 degrees and 270 degrees respectively, and may train the rotation classifier to reduce an average value of result values obtained by applying the actual rotation values (90 degrees, 180 degrees, and 270 degrees) and the rotation prediction values predicted by the rotation classifier for the three rotated images to the KLD function.

The image analysis apparatuses, inspection devices, capturing devices, processors, memories, computing devices, storage devices, sensors, input devices, output devices, communication devices, communication buses, image analysis apparatus 100, inspection device 510, capturing device 520, image analysis apparatus 530, image analysis apparatus 600, processor 610, memory 620, computing device 700, processor 710, storage device 720, sensor 730, input device 740, output device 750, communication device 760, communication bus 770, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. A processor-implemented method with image analysis, the method comprising:
   receiving a test image;
   generating a plurality of augmented images by augmenting the test image;
   determining classification prediction values for the augmented images using a classifier;
   determining a detection score of the test image based on the classification prediction values; and
   determining whether the test image corresponds to anomaly data based on the detection score and a threshold.

2. The method of claim 1, wherein the generating of the augmented images comprises:
   generating transformed images by transforming the test image; and
   generating a rotated image by rotating the test image.

3. The method of claim 2, wherein
   the determining of the classification prediction values comprises determining classification prediction values for the transformed images using the classifier, and
   the classifier comprises an image classifier.

4. The method of claim 2, further comprising:
   determining a rotation prediction value for the rotated image using a rotation classifier; and
   determining a rotation loss value based on the rotation prediction value and a rotation value applied for the rotating of the test image.

5. The method of claim 4, wherein the determining of the detection score comprises:
   determining a classification entropy value based on the classification prediction values; and
   determining the detection score based on the classification entropy value and the rotation loss value.

6. The method of claim 5, wherein the determining of the detection score based on the classification entropy value and the rotation loss value comprises determining a result value determined by adding the classification entropy value and the rotation loss value, the result value being the detection score.

7. The method of claim 5, wherein the determining of the classification entropy value comprises determining the classification entropy value by applying an average value of the classification prediction values to an entropy function.

8. The method of claim 1, wherein the determining of whether the test image corresponds to the anomaly data comprises:
   in response to the detection score being greater than or equal to the threshold, determining that the test image corresponds to the anomaly data; and
   in response to the detection score being less than the threshold, determining that the test image corresponds to normal data.

9. The method of claim 8, wherein
   the anomaly data is data outside a range of training data used during a training process of the classifier, and
   the normal data is data within the range of training data used during the training process of the classifier.

10. The method of claim 3, wherein
    the determining of the classification prediction values comprises extracting features from the augmented images using a convolutional neural network, and
    the image classifier is configured to receive the extracted features as inputs and provide the classification prediction values for the augmented images respectively based on the input features.

11. The method of claim 1, wherein the test image is a training image, and further comprising:
- determining a loss value based on the classification prediction values; and
- training the classifier based on the loss values.

12. A non-transitory computer-readable storage medium storing instructions that, when executed by one or more processors, configure the one or more processors to perform the method of claim 1.

13. An apparatus with image analysis, comprising:
one or more processors configured to:
- receive a test image,
- generate a plurality of augmented images by augmenting the test image,
- determine classification prediction values for the augmented images using a classifier,
- determine a detection score of the test image based on the classification prediction values, and
- determine whether the test image corresponds to anomaly data based on the detection score and a threshold.

14. The apparatus of claim 13, wherein, for the generating of the augmented images, the one or more processors are configured to:
- generate transformed images by transforming the test image, and
- generate a rotated image by rotating the test image.

15. The apparatus of claim 14, wherein the one or more processors are configured to:
- determine a rotation prediction value for the rotated image using a rotation classifier, and
- determine a rotation loss value based on the rotation prediction value and a rotation value applied for the rotating of the test image.

16. The apparatus of claim 15, wherein, for the determining of the detection score, the one or more processors are configured to:
- determine a classification entropy value based on the classification prediction values, and
- determine the detection score based on the classification entropy value and the rotation loss value.

17. The apparatus of claim 16, wherein, for the determining of the classification entropy value, the one or more processors are configured to determine the classification entropy value based on an average value of the classification prediction values.

18. The apparatus of claim 13, wherein, for the determining of whether the test image corresponds to the anomaly data, the one or more processors are configured to:
- in response to the detection score being greater than or equal to the threshold, determine that the test image corresponds to the anomaly data; and
- in response to the detection score being less than the threshold, determine that the test image corresponds to normal data.

19. The apparatus of claim 13, further comprising a memory storing instructions that, when executed by the one or more processors, configure the one or more processors to perform the receiving of the test image, the generating of the augmented images, the determining of the classification prediction values, the determining of the detection score, and the determining of whether the test image corresponds to the anomaly data.

20. A processor-implemented method with image analysis, the method comprising:
- generating a plurality of augmented images by augmenting a test image;
- determining prediction values for the augmented images using one or more classifiers;
- determining a detection score of the test image based on the prediction values; and
- determining, based on the detection score and a threshold, whether the test image corresponds to data outside a distribution of training data used to train the classifier.

21. The method of claim 20, wherein the determining of whether the test image corresponds to data outside the distribution comprises determining that a class of the test image is not included in the training data.

22. The method of claim 20, wherein the test image is of an object, and further comprising detecting a defect in the object in response to the detection score being greater than or equal to the threshold.

23. A processor-implemented method with image analysis, the method comprising:
- receiving a training image;
- generating a plurality of augmented images by augmenting the training image;
- determining classification prediction values for the augmented images using a classifier;
- determining a loss value of the training image based on the classification prediction values; and
- training the classifier based on the loss values.

* * * * *